Figure 1:
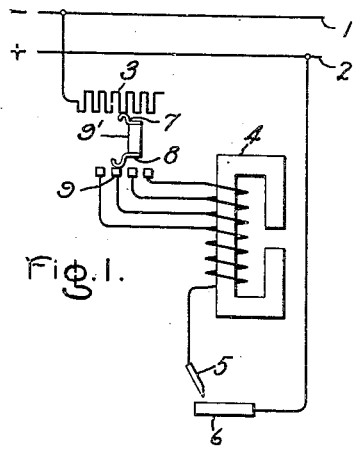

S. R. BERGMAN.
ELECTRIC WELDING AND REACTOR.
APPLICATION FILED JUNE 25, 1920.

1,353,711.

Patented Sept. 21, 1920.

Inventor:
Sven R. Bergman,
by *Albert G. Davis*
His Attorney.

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

ELECTRIC WELDING AND REACTOR.

1,353,711.   Specification of Letters Patent.   Patented Sept. 21, 1920.

Application filed June 25, 1920. Serial No. 391,721.

*To all whom it may concern:*

Be it known that I, SVEN R. BERGMAN, a subject of the King of Sweden, residing at Nahant, county of Essex, State of Massachusetts, have invented certain new and useful Improvements in Electric Welding and Reactors, of which the following is a specification.

My invention relates to electric arc welding, cutting or repairing and to a new type of reactor that is particularly adapted for circuits of the type used in electric welding, cutting or repairing, in which circuits the current must be adjusted over a considerable range in order to meet the conditions imposed by various classes of work.

An object of my invention is to provide an apparatus for circuits of the type referred to which shall insure a proper reactance voltage for efficient operation even though the current be adjusted over a wide range.

A further object of my invention is to provide an apparatus for electric arc welding, cutting or repairing which shall adjust the reactance to the proper value for efficient operation with any given current without the necessity for care or skill on the part of the operator.

A further object of my invention is to provide a new type of reactor in which the inductance shall be automatically and inherently adjusted to different values for different values of current therethrough.

Electric arc welding, cutting or repairing with direct current requires the presence of a certain amount of reactance in the circuit to steady the arc. This reactance is commonly provided by connecting a reactor or self-inductance coil in series in the welding circuit. As is well-known to those skilled in the electrical art such reactor has no effect on the current in the circuit while the current is steady, but becomes immediately effective to develop an electromotive-force whenever a change in the current produces a change of the flux threading the turns of the reactor. Such electromotive-force is always in a direction to oppose the tendency of the current to change and therefore by the use of a proper amount of reactance the current through the circuit is maintained reasonably constant even though variations occur in the resistance of the arc. Such variations may be due to ununiformities in the work or electrode, but in metallic arc welding are mainly due to variations in the length of the arc, caused by a failure to feed the electrode toward the work at the exact rate it is being consumed by the welding current. In order to make it unnecessary to provide a separate apparatus for each current value required in such arc circuits, it is customary to provide means for adjusting the current delivered to the welding circuit, and one such apparatus which I have designed for metallic arc welding is arranged with a number of terminals giving respectively 75, 100, 125, 150, 175 and 200 amperes. Where carbon arcs are used much greater values of current will be encountered. I have discovered that a reactor which is satisfactory for 75 amperes is almost useless for the higher values of currents, owing to the fact that it is impossible to design a practical reactor having a fixed number of turns and a fixed air gap reluctance, which reactor will be effective for the low values of current and remain unsaturated for the higher values of current. In order to remedy this defect which I have discovered in the operation of reactors in circuits of the type referred to, I have conceived the idea of adjusting the current and the reactor simultaneously and have further conceived a type of reactor in which the adjustment of the reactance shall occur automatically and inherently.

My invention will be better understood from the following description taken in connection with the accompanying drawings, and its scope will be pointed out in the appended claims.

Figure 2:
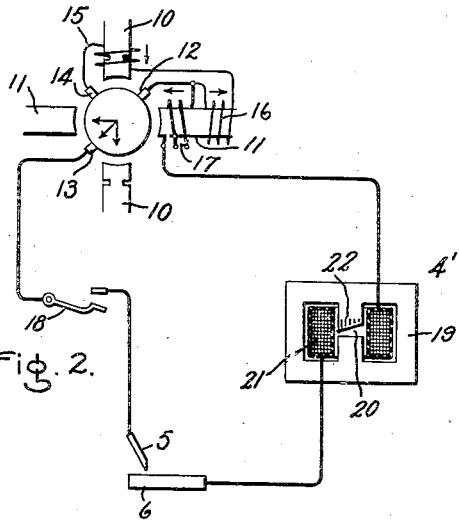
Figure 4:
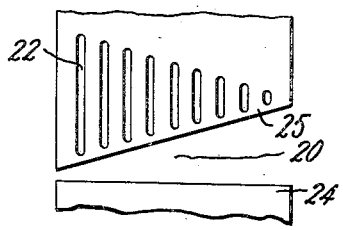
Figure 5:
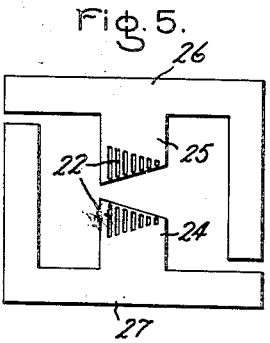
Figure 6:
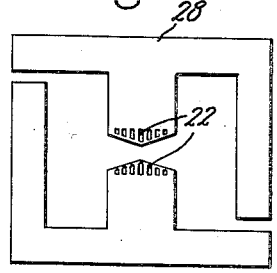
Figure 9:
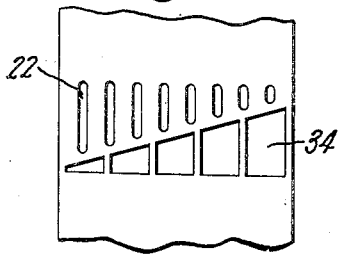
Figure 7:
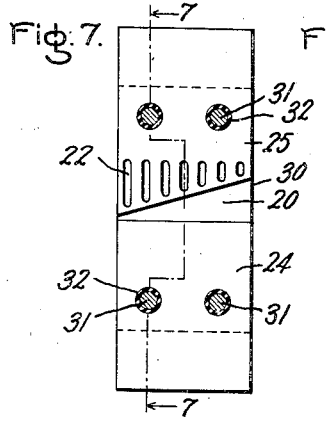
Figure 8:
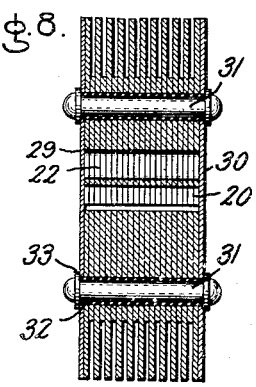
Figure 3:
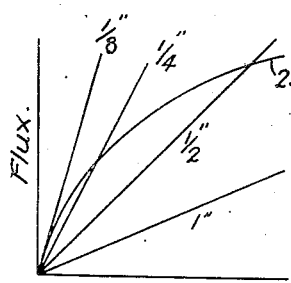

Referring to the accompanying drawings Figures 1 and 2 are circuit diagrams showing embodiments of my invention; Fig. 3 is an explanatory diagram; Figs. 4, 5 and 6 are detail views showing various forms of my reactor construction; Fig. 7 shows a variation of the form shown in Fig. 4 and illustrates one way of holding the parts assembled; Fig. 8 is a section of Fig. 7 on the line 7—7; and Fig. 9 represents an alternative air gap construction.

Referring to Fig. 1, a pair of direct current mains 1, 2 are represented as connected through a series resistor 3 and a series reactor 4 to supply current to an electric welding, cutting or repairing circuit comprising the electrodes 5 and 6. In order to control the current, the resistor is made adjustable and such adjustability is indicated in the drawing wherein the sliding contact 7 is arranged to move along the resistor 3. In order to provide the amount of reactance voltage requisite for proper operation with each value of current, I have arranged means to adjust the inductance of the reactor 4 simultaneously with the adjustment of the resistor 3. In the arrangement shown in Fig. 1, this is accomplished by arranging a sliding contact 8 to coöperate with contacts 9 which are connected to taps leading from the winding of reactor 4. The sliding contact devices 7 and 8 are represented as mounted upon a common member 9' so as to move together. The arrangement is such that the number of turns in the reactor is increased when the resistor is adjusted to reduce the current and vice versa. In this way the inductance of the reactor is changed whenever the current is changed and the proper amount of reactance voltage is insured for each value of the current.

It is also possible to adjust the inductance of the reactor by changing the air gap in such a manner as to make the gap smaller for the smaller currents. An actual physical adjustment of the air gap, however, is not feasible in practice because of the high magnetic pulls encountered. In order to avoid the difficulties incident to a movable core reactor and to avoid the complication introduced by a switching arrangement for adjusting the turns of the reactor, I have produced a reactor in which the inductance is inherently and automatically adjusted in accordance with changes in the current through the reactor. By reason of this inherent action I am enabled to do away with all moving devices either internal or external to the reactor for controlling its adjustment.

Fig. 2 diagrammatically represents my improved type of reactor in series with a direct current generator of the type shown in my Patent No. 1,340,004, granted May 11, 1920. This generator is a constant speed machine, one pair of poles 10 of which are arranged to be saturated and the other pair of poles 11 of which are unsaturated during the normal operation. The armature is provided with a pair of main brushes 12 and 13 and an auxiliary brush 14. The arrangement is such that the voltage between brushes 12 and 14 is produced by saturated poles 10 only, while the voltage between brushes 12 and 13 which are connected to the welding circuit is produced by the flux in both the saturated and unsaturated poles.

It is apparent that the voltage between brushes 12 and 14 is constant and the exciting windings 15 and 16 are supplied from this constant voltage. The direction of windings 15 and 16 is such that the magnetomotive-forces of these windings tend to produce fluxes and E. M. F.'s in the same direction between brushes 12 and 13. An adjustable series differential winding 17 carrying the current in the welding circuit is arranged upon the poles 11. The armature reaction of the generator is arranged so that the component thereof in line with poles 11 assists the windings 17 and so that the component thereof in line with poles 10 assists the windings 15. It is apparent that variations in the welding current have little effect upon the flux in the line of poles 10, as thus arranged, since these poles are saturated during normal operation and it is apparent that variations in the welding current have a very marked effect upon the flux in the line of poles 11, since these poles are always undersaturated. The windings are so arranged that with no current flowing, the voltage between the brushes 12 and 13 will be that necessary to strike the arc, and so that with a certain value of load current, preferably about half load, the resultant flux in the poles 11 will be zero. At such a load the voltage between the brushes 12 and 13 will be equal to the voltage between the brushes 12 and 14. When the welding current increases above this value, the flux in poles 11 builds up in the opposite direction so that the electromotive-force between brushes 13 and 14 increases, but with opposite polarity to that between brushes 12 and 14. Therefore, the voltage between brushes 12 and 13 is equal to the voltage between brushes 12 and 14 less the voltage between brushes 13 and 14. When the welding circuit is short circuited, the voltage between brushes 13 and 14 is substantially equal to the voltage between brushes 12 and 14 and opposed thereto. It is apparent therefore that the voltage between the welding circuit brushes 12 and 13 is the algebraic sum of the voltage between brushes 12 and 14 and brushes 13 and 14, while the voltage between brushes 12 and 14 is at all times constant. In order to adjust the welding current to different values, taps are provided by which the number of turns in the series differential winding 17 may be varied.

The reactor 4' of Fig. 2 is connected in series in the welding circuit which leads through any well-known form of circuit controlling device 18 to the electrodes 5 and 6. The reactor is represented as provided with a shell type core 19 having an air gap 20 in the middle leg. The coil 21 of the reactor is represented as wound upon this middle leg of the core. I propose to construct one or both portions of the core adjacent the air gap so as to produce an air gap varying from a certain minimum to a certain maximum length. For example, the minimum may be $\frac{1}{32}''$ and the maximum $\frac{1}{4}''$. In addition to the air gap, I propose to reduce the cross-section of the core adjacent the air gap in such a way that a progressive saturation will be produced as the current through the reactor increases, the arrangement being such that the flux distribution is shifted in a manner to increase the effective air gap reluctance. According to one form of my invention, I arrange slots 22 in the iron in such manner that where the air gap is smallest the slot is longest. This provides for a variable reluctance in series with the air gap. Thus, as the ampere turns of the coil change the saturation will take place from left to right in Fig. 4. The saturation, in other words, will shift the point of minimum gap toward the point of maximum gap.

In order to explain the principle of my invention, consider first the effect of an actual change in the mechanical dimensions of an air gap. In Fig. 3 the straight lines marked $\frac{1}{8}''$, $\frac{1}{4}''$, $\frac{1}{2}''$ and $1''$ show the variations of flux which take place with variations of current with air gaps of the several dimensions indicated. The curve 23 of Fig. 3 represents the saturation curve of my improved reactor. At zero current this curve is tangent to the curve marked $\frac{1}{8}''$. Hence, at that point the rate of change of flux due to the change in current is equivalent to that due to a $\frac{1}{8}''$ gap. At the point where curve 23 cuts the $\frac{1}{2}''$ gap curve, the tangent will be parallel to the $1''$ gap curve. Hence, at that point the rate of change of the flux due to the change in the current is equivalent to that due to a $1''$ gap. Since the tangent to curve 23 at any point will give the rate of change of the flux due to a change in current, it is obvious that this reactor is equivalent in its operation to a reactor having a variable gap which varies from $\frac{1}{8}''$ to $1''$ in length.

In the modification shown in Fig. 4, the length of the slots 22 is varied in such a manner that a line drawn tangent to the upper edges of the slots is not parallel to the upper face of the pole piece 24, but makes an angle therewith about equal to the angle between the pole pieces 24 and 25. This arrangement somewhat increases the maximum effective air gap over that produced in the arrangement indicated in Fig. 1 and shown more clearly in Fig. 7.

Fig. 5 shows one method of building up a laminated core structure having the middle leg constructed to provide an inherently adjusted air gap. In Fig. 5 both pole pieces 24 and 25 are slotted, and but two shapes of laminations 26 and 27 are required to build up the reactor.

Fig. 6 shows a modified arrangement in which but a single shape of punching 28 is required to build up the reactor. The air gap in Fig. 6 is represented as tapering both ways from the middle.

In order to avoid waste in material and in order to enable less expensive dies to be used, I preferably construct the middle leg of the reactor as shown in Figs. 7 and 8. One simple die only need be used and the return path of the core may be made up of straight pieces sheared to the proper lengths and built up in any manner well-known in the art. The one apparent disadvantage of such a construction lies in the large number of lap joints which are used, and, which for a transformer would not be advantageous; but in the case of a reactor containing an air gap in the magnetic circuit the additional reluctance of the lap joints is negligible. I prefer to rivet the parts of the center leg together by the aid of heavy end sheets 29 and 30 made of brass and rivets 31 insulated by the aid of paper bushings 32 and mica washers 33.

Instead of using a simple air gap the equivalent of the air gap may be secured by slotting the iron as shown in Fig. 9. The slots 34 of Fig. 9 cut away so much material that the remaining portions of the iron become so highly saturated, with even the smallest current through the coil of the reactor, that the reluctance of this part of the core is substantially independent of variations in current through the coil. The slots 34 vary in size to give the effect of a tapered air gap and in addition the slots 22 provide a variable reluctance.

While I have described my invention particularly in connection with arc welding circuits, it will be obvious to those skilled in the art that in its broadest aspects my invention is not limited to such circuits, but is applicable to any circuit in which a reactor is necessary to smooth out fluctuations in current and in which the current must be adjusted through a considerable range of values. An example of such a circuit may be taken from the art of line welding machines, in which a roller electrode moves over the seam to be welded. In apparatus of this type a series reactor is useful to provide the voltage necessary to break down the high resistance due to scale or other irregularities which are encountered and to weld sheets of different thickness different values of current are required.

What I claim as new and desire to secure by Letters Patent of the United States, is:—

1. A system comprising a source of direct current, a load circuit supplied thereby adapted to provide wide and sudden changes in resistance, means for adjusting the current supplied from said source to said load circuit and a reactor in series in said load circuit, characterized by the fact that adjustments of said current are arranged to vary the inductance of said reactor.

2. An arc welding system comprising a source of direct current connected to supply current to a welding circuit, means whereby the welding current supplied at any given voltage may be adjusted and a reactor in series in said welding circuit characterized by the fact that adjustments of the welding current are arranged to vary the inductance of said reactor.

3. An arc welding system comprising a welding circuit, a source of direct current for supplying welding current to said circuit, means whereby the welding current supplied at any given voltage may be adjusted and a reactor in series in the welding circuit constructed and arranged inherently to adjust the effective air gap of said reactor in accordance with adjustments in the welding current.

4. A reactor comprising a coil, and a magnetic core provided with an air gap characterized by the fact that said core is provided with portions adapted to become progressively saturated so as inherently to vary the reluctance of said air gap with changes in current in said core.

5. A reactor comprising a coil and a flux path provided with a portion varying from a minimum to a maximum length and constructed and arranged to have a reluctance substantially independent of variations in current through said coil, and a portion in series with said first portion arranged to vary the reluctance and change the flux distribution through said first portion upon variations in current through said coil.

6. A reactor comprising a coil and a core of magnetic material provided with a tapered portion to produce an air gap varying from a minimum to a maximum length, said tapered portion being reduced in cross section whereby saturation causes the effective air gap to increase with increasing current through said coil.

7. A reactor comprising a coil and a core of magnetic material provided with an air gap, said core being constructed and arranged to become saturated adjacent said gap so as inherently to increase the effective length of said gap as the current through said coil increases.

8. A reactor comprising a coil and a core of magnetic material provided with a fixed air gap of gradually varying length, said core being slotted adjacent a face of said air gap the depth of said slots being greatest near the shortest part of said gap and gradually decreasing toward the longest part of said gap, whereby the reduction in cross section caused by said slots causes the saturation due to increased currents in said coil to vary the effective length of the gap.

In witness whereof, I have hereunto set my hand this 23rd day of June 1920.

SVEN R. BERGMAN.